(12) United States Patent
Burnstein et al.

(10) Patent No.: US 6,510,376 B2
(45) Date of Patent: Jan. 21, 2003

(54) METHOD TO CONTROL REFUSE MANAGEMENT FLEETS

(76) Inventors: Matthew Burnstein, 6336 W. Oaks, West Bloomfield, MI (US) 48324; James W. Barnthouse, 6035 Cheryl Ct., West Bloomfield, MI (US) 48324

( * ) Notice: Subject to any disclaimer, the term of this patent is extended or adjusted under 35 U.S.C. 154(b) by 0 days.

(21) Appl. No.: 09/803,837

(22) Filed: Mar. 12, 2001

(65) Prior Publication Data

US 2001/0049583 A1 Dec. 6, 2001

Related U.S. Application Data

(60) Provisional application No. 60/209,240, filed on Jun. 5, 2000.

(51) Int. Cl.[7] .......................... G06F 17/00; G06F 17/40
(52) U.S. Cl. .................................. 701/117; 701/213
(58) Field of Search ............................. 701/117, 213, 701/50; 342/357.06, 357.07

(56) References Cited

U.S. PATENT DOCUMENTS

| | | | |
|---|---|---|---|
| 5,004,392 A | | 4/1991 | Naab |
| 5,014,206 A | * | 5/1991 | Scribner et al. ....... 340/825.49 |
| 5,119,894 A | * | 6/1992 | Crawford et al. ........... 177/139 |
| 5,209,312 A | * | 5/1993 | Jensen ........................ 177/136 |
| 5,230,393 A | * | 7/1993 | Mezey ........................ 177/139 |
| 5,327,347 A | * | 7/1994 | Hagenbuch .................. 701/35 |
| 5,607,187 A | | 3/1997 | Salive et al. |
| 5,725,253 A | | 3/1998 | Salive et al. |

FOREIGN PATENT DOCUMENTS

DE      4304542 A1  *  8/1994

* cited by examiner

*Primary Examiner*—Michael J. Zanelli
(74) *Attorney, Agent, or Firm*—Young & Basile, P.C.

(57) ABSTRACT

A method is provided for monitoring and controlling the pick up of waste trash which includes providing an identifier visible to the operator of the trash on the trash bin of predetermined customers. The operator or an electronic eye communicating with a computer matches the identifier to a list of the customer names. If the identifier matches a name on the list, the operator proceeds to empty the trash bin. The computer may activate a switch to activate certain components on the trash vehicle and to record data regarding the trash pick up time and location.

18 Claims, 2 Drawing Sheets

METHOD TO CONTROL REFUSE MANAGEMENT FLEETS

CROSS-REFERENCE TO RELATED APPLICATION

This application claims the benefit of U.S. Provisional Application No. 60/209,240 filed Jun. 5, 2000.

FIELD OF THE INVENTION

The invention relates to a method to control refuse management fleets and control the pick up of refuse bins, especially those from commercial clients.

BACKGROUND OF THE INVENTION

Refuse management of residential and commercial garbage is a large industry wherein one fleet may service hundreds of commercial businesses in multiple cities or regions. In a competitive industry such as in refuse management there is always a need to be as efficient as possible. It is therefore imperative that the management of the refuse system can monitor its personnel and fleet operations to provide efficient use of both the personnel and the trucks on a day by day schedule. It is also imperative to management that only documented and paying customers are serviced by the trash pick-up fleet. It is further another important aspect for personnel management to monitor the location and time of the various customer pick-ups to provide efficient distribution of personnel and fleet vehicles.

As costs for the disposal of trash increase, it may be desirable to monitor the weight of the trash during the pick up process to help determine current charges and estimate future growth. Therefore, it would also be desirable to provide a means to weigh the trash of each particular customer and record the information for each customer.

SUMMARY OF THE INVENTION

It is the intent of the present invention to address the aforementioned concerns. The present invention provides a method for controlling refuse management fleets of trucks which empty refuse or trash bins of designated customers into a container attached to each truck. The method includes verifying that the refuse bin belongs to a documented customer. An identifier on the refuse bin is compared to a list of documented customers, each having a designated identifier. If the identifier on the refuse bin does not match a documented customer, the disposal truck goes to the next refuse bin. If the identifier matches a documented customer, then the trash is picked up and certain tracking and documentation information is monitored. In one aspect of the invention, the method includes providing a computer controller on the truck such that the computer controller has an internal clock for monitoring realtime for recording the time of certain actions.

In another aspect of the invention, the identifier may be a bar code placed on the refuse bin. In yet another aspect of the invention, a list of designated customers can be stored either in the computer or on a hard copy ledger. As an alternative, each refuse bin may be equipped with a transmitter or computer chip which provides an output signal as the identifier.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENTS

Figure 1:
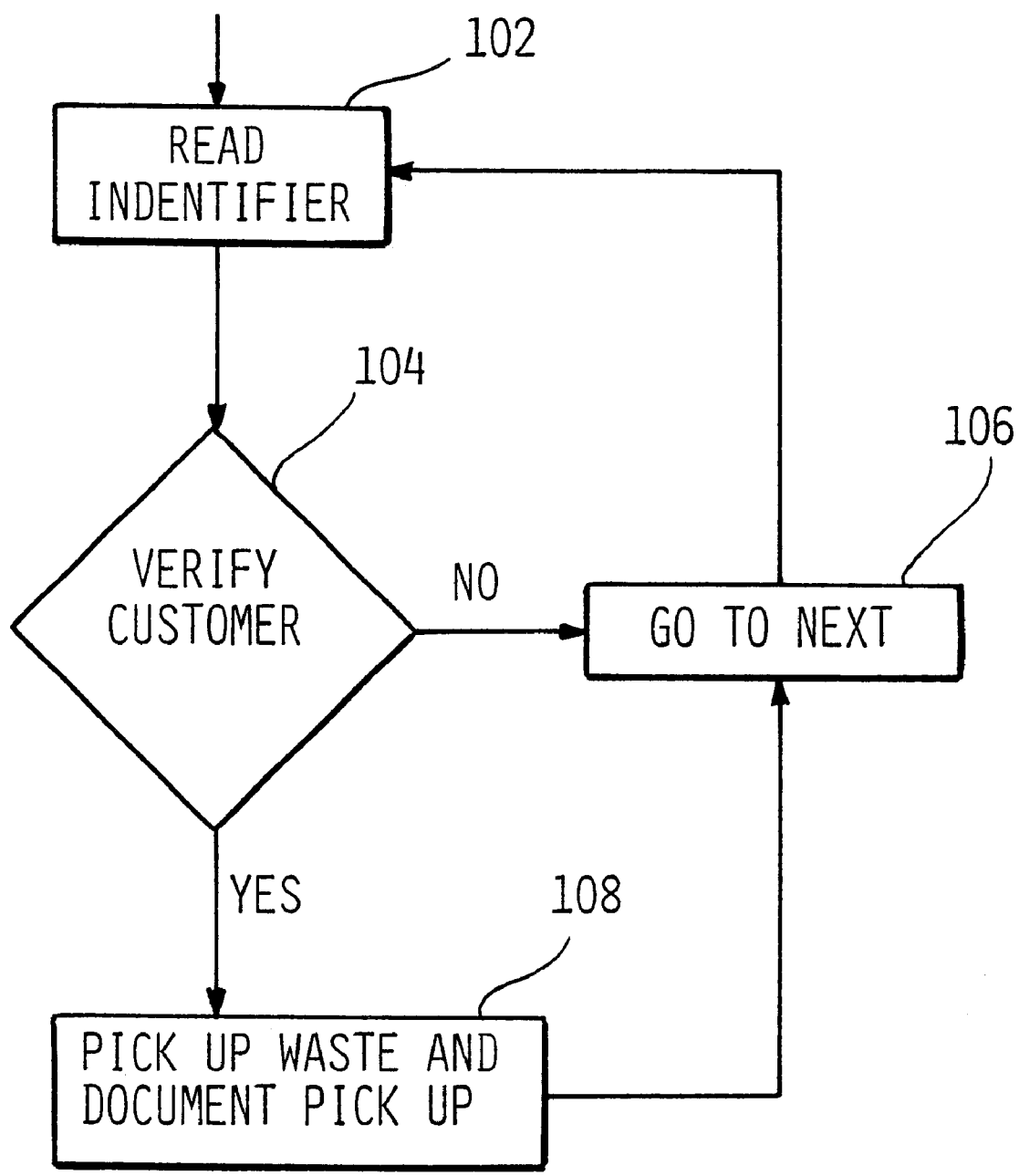
FIG. 1 is a flowchart illustrating th basic steps of the method to control refuse management fleets according to the present invention.

The flowchart in FIG. 1 shows the basic steps for monitoring an individual disposal truck 10 on its disposal route. The method in FIG. 1 is now applicable to commercial customers where bins 12 are provided by the refuse disposal company. An identifier 16 is associated with each refuse bin 12 so that the disposal truck operator can verify that the particular refuse bin 12 belongs to a documented customer (step 102). If the identifier does not match a name on the list of documented customers in step 104, the disposal truck operator is directed to go to the next refuse bin (step 106). If the identifier matches a name on the list of documented customers in step 104, the disposal truck operator may proceed to dispose of the waste in the refuse bin 12 (step 108). Certain relevant information may be manually stored by the operator himself or automatically stored in a computer processing unit (CPU) 20 at each pickup (step 108). Details of the means for verifying documented customers and for documenting relevant information at each trash pick up will be discussed hereafter.

Figure 2:
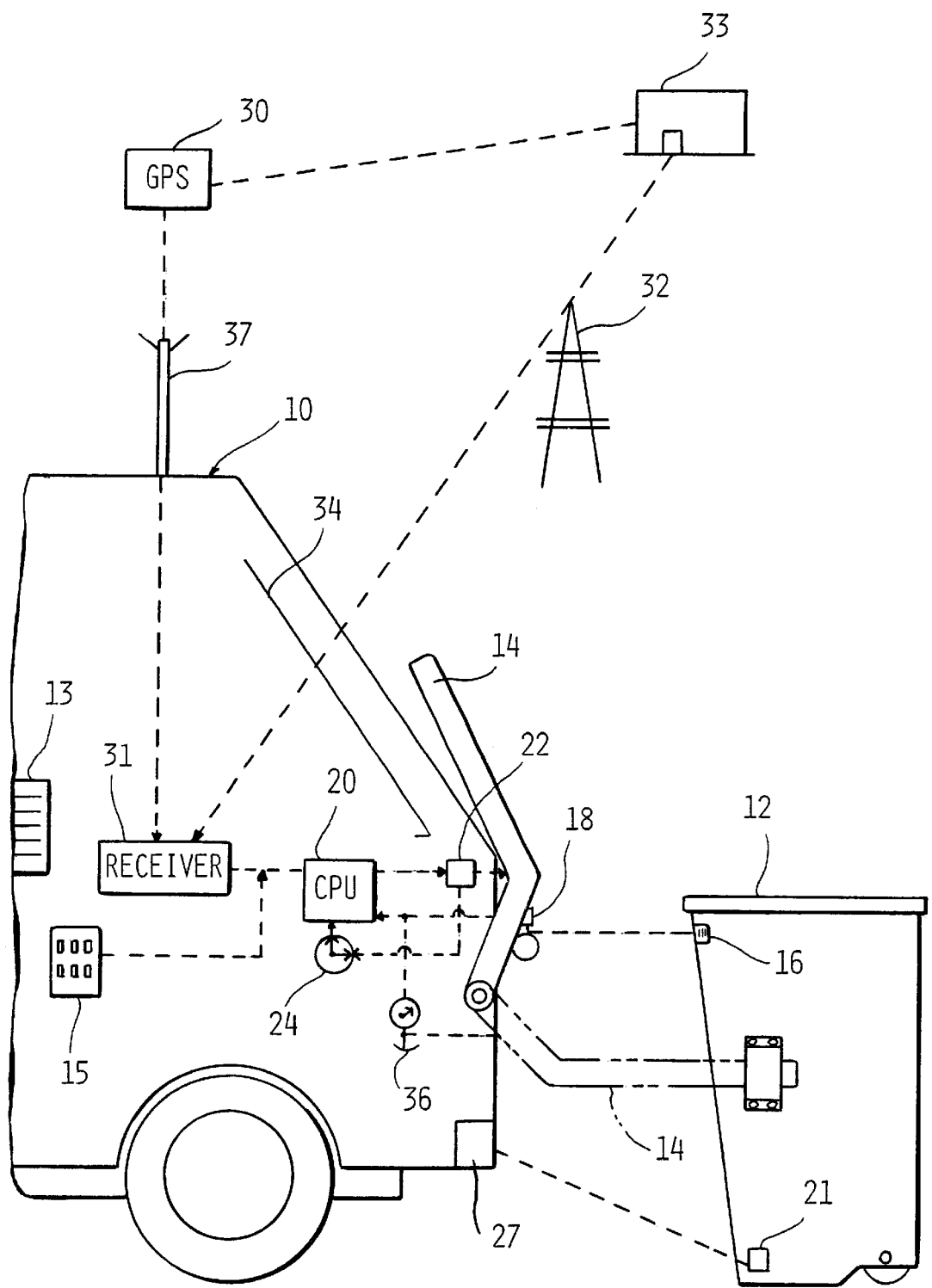
FIG. 2 is a schematic drawing of a fleet vehicle at a trash pick-up location.

Referring to FIG. 2, one method to monitor trash pick up is to assign each customer with a unique identifier that can be placed on the bin 12 of the customer. One example of an identifier is a bar code 16. Another example may be alphanumeric symbols located on the trash bin 12. In yet another example, each trash bin may have a small transmitter or computer chip installed therein. The transmitter or computer chip could be embedded, welded, or otherwise attached to the trash bin. In one scenario, the operator of the trash vehicle 10 can visually match the alphanumeric symbols with a ledger 13 in the vehicle containing each customers name and his identifier. If the alphanumeric symbol of the bin is located in the ledger 13, the operator may proceed to pick up and empty the trash bin 12. The ledger 13 can be marked by the operator to indicate the time of pick up. This is the simplest and easiest means to monitor the pick up of trash by a particular trash vehicle. One disadvantage of this method is that it is subject to human error such as if the operator forgets to mark the ledger 13.

A computer/CPU 20 placed onboard or at a remote location provides added benefits for monitoring a fleet of trash pick-up trucks. The computer 20 can eliminate the ledger 13. The operator can key in the identifier 16 on the bin into a keypad 15. The computer can be programmed to search a stored customer listing database for a match. The computer will provide a predetermined signal, such as a flashing light or the actuation of certain components if a match has been made, as will be discussed hereinafter.

If a computer 20 is provided, the trash vehicle 10 can be supplied with a camera or scanner 18 for reading the identifier on a customer's trash bin 12. A bar code 16 will be attached to a customer's trash bin 12. The trash vehicle 10 will move adjacent to the trash bin 12 so that the camera or scanner 18 on the vehicle can read the bar code 16. A set of approved customer bar codes associated with predetermined customer names are stored within the computer 20. If the bar code 16 on a specific trash bin 12 matches the stored code in the computer 20, the computer will send a predetermined signal to the operator as discussed supra.

As an alternative, each trash bin 12 may be provided with a transmitter or computer chip 21 which can generate an output signal. Each trash vehicle 10 will then be provided with signal receiving equipment 27 to receive and decode the output signal. If the output signal generated from a specific trash bin 12 matches a stored code in the computer, the computer will send a predetermined signal to the operator.

One type of signal in which the computer could provide to the operator is a light or audible signal to indicate to the operator that this is an accepted trash bin 12 and that the operator may proceed to manually or mechanically empty the designated trash bin 12. In a more developed system, the trash pick-up truck will be equipped with a switch 22 that is activated by the computer 20 when the bar code 16 or output signal matches the stored code in the computer 20. The switch 22 will allow the lift 14 to pivot downwardly and to complete the pick up of the trash bin 12. If the bar code 16 or output signal does not match a stored code in the computer 20, the deactivated mode of switch 22 will also maintain the lift 14 in a deactivated mode so that the lift 14 cannot pivot to retrieve the trash bin 12.

The computer system 20 may have an associated clock 24 monitoring realtime. Either the time that the identifier is keyed into the computer by the operator; or the time when the computer indicates a match may be recorded and stored within the computer 20. As an alternative, the time may be recorded and stored within the computer 20 each time the lift 14 is activated. In another aspect of the invention, it is conceivable that the switch 22 will send a signal to the clock 24 to record a time. The lift 14 can then be regulated manually or automatically by the activation of the switch.

It is also possible to monitor the location of the trash vehicle 10 by radio or cellular signals 32 or by using global positioning signals (GPS) 30 to locate the trash vehicle 10 at any given time. In a GPS system, a GPS receiver 31 receives data signals from a GPS satellite constellation 30 and triangulates the data signals to obtain the measured position or location of the receiver. A GPS receiver 31 would be installed in each trash vehicle 10. Each GPS receiver 31 would generate output signals which typically contain the longitude and latitude of the particular GPS receiver antenna 37. As a result, the base station 33 would include signal receiving equipment to receive and decode a particular GPS receiver information including the longitude and latitude of the trash vehicle 10 at specific time intervals. The computer 20 can also be programmed to actuate an output signal location to the base station 33 when certain criteria is met. This criteria could include each time the lift 14 is activated or each time there is a match with the identifier within the computer ledger. A similar means of monitoring the location of a trash vehicle is by radio signals from tower 32 to a receiver 31.

It is also feasible to program the computer 20 to record location and time when other components on the trash vehicle are activated. Such criteria includes whenever the compactor 34 on the trash vehicle 12 is activated or when a scale 36 detects a weight over a certain amount.

As just mentioned, another source of information that is advantageous to provide for controlling the refuse management fleets is to include the weight of the trash bin 12 before it is emptied into the trash vehicle 10. The environmental concerns of landfills has driven the cost of disposal of waste materials upwardly. In an effort to extend those fees onto the customers in an equitable manner, it would be necessary to ascertain the amount of trash a particular customer has over a period of time. To attain this information, uniform trash bins 12 with a known empty weight would be distributed to listed customers. Each bin 12 would be provided with an identifier such as a bar code 16 visually located on the bin. Each trash vehicle 12 would be supplied with a scale 36 connected to the lift 14 such that the weight of the bin 12 as it is being lifted into the trash vehicle 12 can be recorded. The weight of a filled trash bin minus the known empty weight equals the amount of trash for a specific customer. The scale reading and algorithms to calculate the amount of trash would be stored and provided in the computer 20.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for controlling refuse management fleets of trucks which has a lift for picking up refuse bins and a compactor, said method empties refuse bins of predetermined customers into a container attached to each truck, the method comprising the steps of:

providing a computer controller on the truck, said computer controller having an internal clock for monitoring realtime;

providing an identifier for each predetermined customer;

providing a list in the truck of predetermined customer names;

comparing the identifier with the list of the predetermined customers' names;

providing at least one of an audible and light signal if the identifier matches one of the predetermined customers' names; and emptying the customer's refuse bin when the identifier matches one of the predetermined customers' names.

2. The method of claim 1, wherein the identifier is a bar code placed on the refuse bin.

3. The method of claim 1, further comprising the step of storing the realtime in the computer when the identifier matches one of the predetermined customers.

4. The method of claim 3, further comprising the step of determining and storing the actual location of the truck when emptying the customer's refuse bin.

5. The method of claim 4, wherein the step of determining the actual location of the truck includes the step of using global positioning signals from a satellite.

6. The method of claim 4, wherein the step of determining the actual location of the truck includes the step of using one of radio and cellular signals.

7. The method of claim 1, wherein the list of predetermined customers is stored in the computer.

8. The method of claim 1, wherein the step of emptying the customer's refuse bin when the identifier matches one of the predetermined customers' names includes the steps of providing a switch for allowing the lift to pivot downwardly, and activating the switch via the computer if the identifier matches one of the predetermined customers' names to allow the lift on the truck to pivot toward the trash bin.

9. The method of claim 8, further comprising the step of deactivating the switch via the computer for preventing the lift from pivoting to retrieve the customer's refuse bin when the identifier does not match one of the predetermined customers' names.

10. The method of claim 1, further comprising the step of recording the time into the computer when the identifier matches one of the predetermined customer names.

11. The method of claim 1, further comprising the step of weighing the customer's refuse bin before emptying the refuse bin.

12. The method of claim 11, further comprising the step of determining and recording at least one of the time and location of the truck when weighing the refuse bin.

13. The method of claim 11, further comprising the step of recording the time and location of the customer's refuse bin only when the weight of the customer's bin is over a predetermined amount.

14. The method of claim 1, further comprising the step of compacting the trash after emptying the customer's refuse bin.

15. The method of claim 14, further comprising the step of determining and recording at least one of the time and location of the truck when compacting the trash.

16. A method to control refuse management fleets of trucks which has a lift for picking up refuse bins and a compactor, said method empties refuse of predetermined customers into a container attached to each truck, the method comprising the steps of:

provinding a computer controller, said computer controller having a list of predetermined customers names and associated identifiers;

comparing the identifier on each refuse bin;

comparing the identifier to the list of predetermined customer names and associated identifiers;

providing a computer operable switch for activating the lift when the identifier matches one of the associated identifiers; and emptying the refuse bin when the identifier matches one of the associated identifiers.

17. The method of claim 16, wherein the identifier is a bar code placed on the refuse bin.

18. The method of claim 16, wherein the identifier is an output signal generated by one of a transmitter and computer chip attached to the trash bin.

* * * * *